Dec. 31, 1940.   T. B. CHACE   2,226,695
CLAD METAL AND METHOD OF MAKING SAME
Filed Jan. 7, 1937
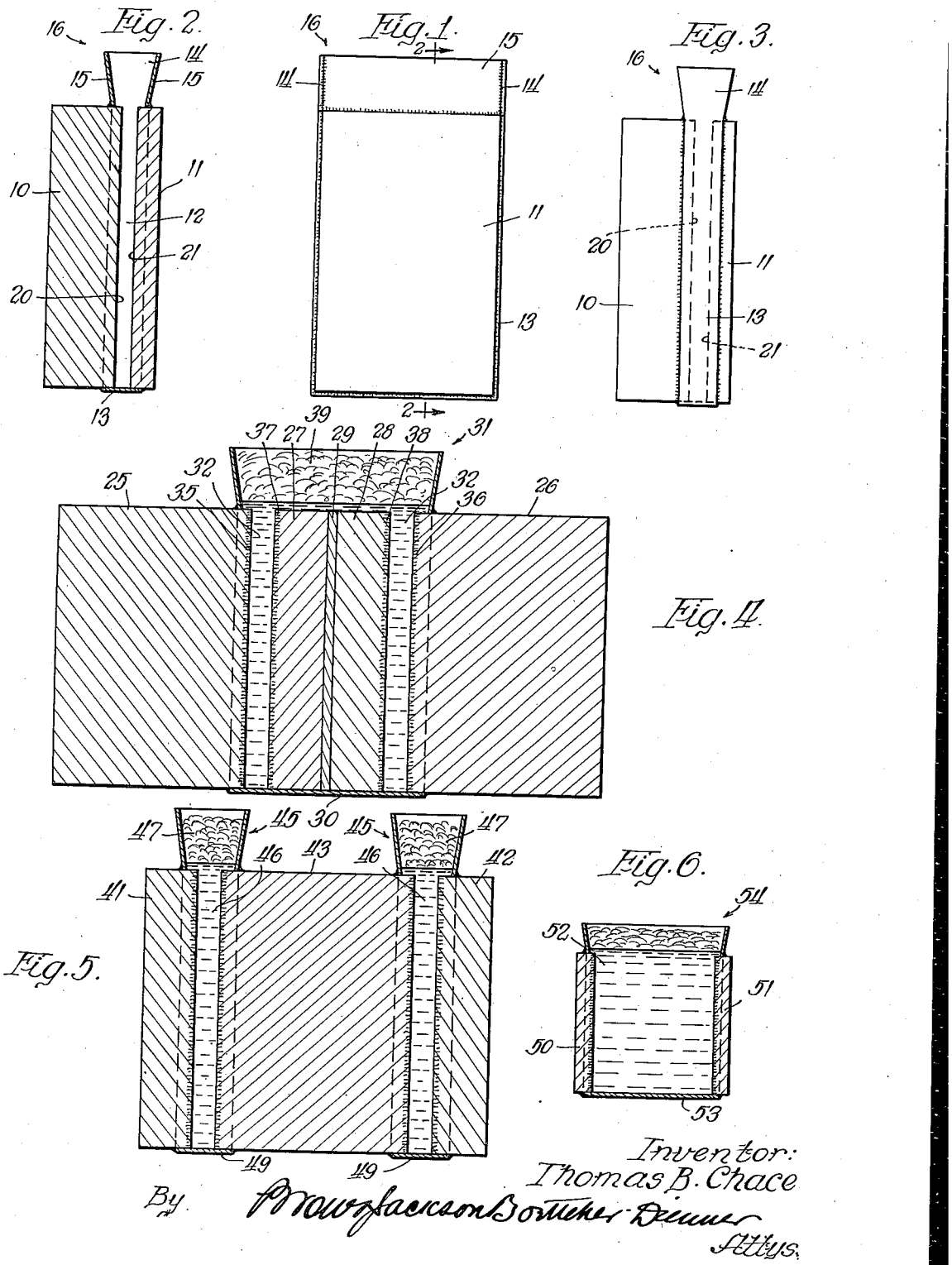
Inventor:
Thomas B. Chace Patented Dec. 31, 1940

2,226,695

UNITED STATES PATENT OFFICE 2,226,695

CLAD METAL AND METHOD OF MAKING SAME

Thomas B. Chace, Winnetka, Ill., assignor, by direct and mesne assignments, to Clad Metals Industries, Inc., Chicago, Ill., a corporation of Illinois Application January 7, 1937, Serial No. 119,404

3 Claims. (Cl. 22—204)

My invention relates generally to methods of and means for manufacturing composite metal slabs, and it has particular relation to the manufacture of such slabs that are suitable for rolling and drawing to form sheets, rolled sections, and wires having outer surfaces of corrosion resisting metal and the interior being formed of another metal.

It is essential that composite slabs be bonded together in such manner that they can be rolled or drawn for reducing them to form products such as plates, sheets, strips, rolled sections, and wires. As the composite slab is being reduced in section by the rolling or drawing process, the bonded section is likewise reduced in thickness. In order that the bonded section will withstand the stresses imposed thereon during the rolling or drawing operation, it must possess certain characteristics. There must be sufficient depth of diffusion of the metals forming the slabs each into the other in order to create sufficient strength to withstand the separating force of the rolling or drawing process. The alloy that is formed at the union of the two metals must be sufficiently ductile and free from hot or cold short ranges during hot rolling, annealing, or cold rolling to prevent cracking. In addition, the ductility must be such that the rolled or drawn material will stand further forming and drawing to form the finished product. The bond between the two slabs forming the composite slab must be uniform, since the finished material is sheared, slitted, or stamped into various shapes and sizes, depending upon the application for which it is intended. If the bond is not uniform, there will be small sections in which proper diffusion has not taken place because of lack of proper contact during the bonding. These non-uniform sections show up when the composite material is being further processed, as for example in the making of tanks, pipes, and the like in which seam welding is employed to provide liquid-tight joints. The non-uniform sections make it difficult to properly arc weld the joint.

While the present invention is particularly directed to the formation of composite metal slabs formed of a steel backing slab and a stainless steel slab, it is not to be limited to these particular materials. As will appear hereinafter, the invention may be employed in the manufacture of composite slabs of other metals than these particular metals.

According to the prior art, there are two generally accepted methods of applying the stainless steel to the steel backing slab. According to one of these methods, the two layers of material are placed one on top of the other and the edges are sealed together. The composite slab is then placed in a furnace and subjected to a temperature of about 2300° F. for preheating it to the hot rolling temperature. The composite slab is then passed through reducing rolls after it has been removed from the furnace to bond the two metals together and to reduce it to the desired dimensions. The other method comprises the casting of one of the metals onto the other one. For example, the stainless steel is poured in the molten state onto a steel backing slab. The composite slab is then reduced in section by a suitable rolling or drawing process.

When the preheating and rolling method is employed, certain difficulties are encountered which make this process undesirable. Because of the difference in thermal expansion of the two metals, it is difficult to maintain the full surface contact during the heating process. The affinity of the chromium from the stainless steel for the carbon of the steel backing slab may form a brittle alloy at the bond which breaks up during the rolling or drawing process. There is usually an insufficient depth of diffusion of the two metals. A thin coating of oxide forms on the stainless steel which may prevent bonding at various points during the momentary pressure of the reducing rolls after the composite slab has been removed from the furnace. This momentary pressure is usually insufficient to create sufficient depth of diffusion and to penetrate the thin oxide film and, because of the brittle alloy formed by the chromium and carbon, there is a likelihood that the bonding area will be broken up during the subsequent rolling or drawing operations.

Certain difficulties are also encountered when the casting process is employed to join the stainless steel to the carbon steel backing slab. The melting temperatures of the two metals are substantially the same and, therefore, it is difficult to control the radiation of heat so as to prevent excessive melting of the base metal when the cast metal is poured. This causes an irregular bonding line or considerable difference in depth of diffusion so that the cladding thickness will vary considerably throughout the surface of the finished product. There is then the danger of the presence of unprotected spots after the slabs have been reduced to thin sheets. Moreover, there is the danger of contaminating one metal with the other so that the final analysis of the finished product will not comply with the specifications set up therefor. It is particularly difficult to maintain a uniform bonding line or depth of diffusion if the steel is cast upon the stainless steel. Ordinarily the thickness of the stainless steel slab used will be considerably less than the thickness of the steel serving to back it up. This is due to the relatively large mass of steel that is poured onto the small slab of stainless steel. In this case, a slight flaw in the steel would likely cause a loss of the entire composite slab.

The principal object of my invention is to provide a method of joining two metal slabs or plates together to form a composite slab or plate, the characteristics of which, when subjected to rolling or drawing operations, will be substantially the same as those of a single slab composed of a single metal or alloy.

An important object of my invention is to provide for integrally bonding two slabs or plates of different metals together with a depth of diffusion of each into the other and ductility of the bonded spaced therebetween that will permit rolling or drawing of the composite slab or plate into sheets, plates, wires and the like, having a uniform section of each metal throughout.

An object of my invention is to bond two slabs or plates of metal together by a bonding metal having a melting temperature lower than that of either of them.

Other objects of my invention will, in part, be obvious and in part appear hereinafter.

My invention, accordingly, is disclosed in the embodiments thereof shown in the accompanying drawing, and it comprises the features of construction and method of operation which will be exemplified in the constructions hereinafter set forth, and the scope of the application of which will be indicated in the appended claims.

For a more complete understanding of the nature and scope of my invention, reference may be had to the following detailed description taken in connection with the accompanying drawing, in which:

Figure 1 is a view, in side elevation, of a composite slab arranged to receive the bonding metal between the two sections thereof;

Figure 2 is a sectional view taken along the line 2—2 of Figure 1;

Figure 3 is a view, in end elevation, of the composite slab shown in Figure 1;

Figure 4 is a sectional view of a double composite slab, illustrating how it is formed in accordance with my present invention;

Figure 5 is a cross-sectional view of another form of composite slab; and

Figure 6 is a cross-sectional view of still another form of composite slab.

I have found that it is possible to bond together a steel slab and a stainless steel slab that will withstand the stresses imposed thereon by rolling or drawing operations if the correct combination of heat and pressure is maintained on the composite slab for a considerably longer time than is employed in the heating and rolling process referred to hereinbefore.

With a view to manufacturing large sized composite slabs, the arrangement and construction illustrated in Figures 1, 2 and 3 may be employed. As there shown, a backing slab 10 is provided and is spaced from a facing slab 11 at such a distance that the space represented by the reference character 12 therebetween is sufficient to hold the necessary quantity of bonding metal and flux. The space 12 is made liquid-tight on three sides by a mold strip 13 that may be formed as a single strip of steel, for example a strip of suitable width and one-quarter inch thick, or it may be formed of two or more strips welded together. The longitudinal edges of the mold strip 13 are welded by a suitable arc welding process to the slabs 10 and 11, respectively. The upper ends of the mold strip 13 are provided with wedge-shaped portions as indicated at 14, and side plates 15 are welded therebetween and to the upper surfaces of the slabs 10 and 11 to form a pouring sprue designated generally at 16. It will be observed that the combination of the mold strip 13 and the bonding surfaces 20 and 21 of the slabs 10 and 11, respectively, forms a liquid-tight space into which the bonding metal may be poured through the sprue 16 to provide the desired bond therebetween.

Instead of employing the mold strip 13, a steel bar may be located along the edges between the slabs 10 and 11, the thickness of the bar determining the spacing therebetween.

It will be obvious that any sizes of slabs 10 and 11 may be employed when the mold strip 13 is used, and that it is unnecessary to provide a large number of especially shaped molds for the different sizes of composite slabs to be formed.

The assembly as illustrated in Figures 1, 2 and 3 may be preheated in a reducing atmosphere after the bonding surfaces 20 and 21 have been cleaned, as by sandblasting them. Preferably they are sandblasted before the mold strip 13 is applied. While the assembly is being heated in the reducing atmosphere the bonding metal may be poured into the pouring sprue 16, thereby rendering unnecessary the provision of a flux for preventing oxidation of the bonding surfaces 20 and 21.

Instead of preheating the assembly in the reducing atmosphere, I prefer to preheat it in the usual soaking pit or furnace of the usual steel mill type and to use the customary steel mill methods and equipment for handling it, both in the soaking pit and after it is removed therefrom for rolling or drawing. In such case, the bonding surfaces 20 and 21 must be protected from oxidation, and for this purpose a suitable flux may be baked on each of the surfaces 20 and 21 before the mold strip 13 is applied, or the space 12 may be filled with a suitable flux in either powdered or molten form before preheating. The latter method is preferred since it affords a more complete seal for the surfaces 20 and 21.

The flux that is employed preferably has a relatively low melting point and does not volatilize at high temperatures, such as 2300° F. At such a temperature it should remain viscous and have a low specific gravity so that it floats to the surface readily. I have found that boric acid is suitable for this purpose, or a mixture of six parts of borax and one part of boric acid is also suitable. If the flux is used in powdered form, it should be dehydrated, and if a sufficient quantity is provided to completely fill the space 12 and the pouring sprue 16, it will melt almost immediately on being subjected to the heat of the soaking pit, and will decrease in volume to the top of the slabs 10 and 11.

The assembly is heated to the required temperature which depends upon the size of the composite slab, the particular metals forming it, and the bonding metal that is employed for filling the space 12. Preferably a small melting or casting furnace is located near the soaking pit so that the bonding metal can be poured immediately after preheating. The bonding metal should be kept molten long enough to permit the flux and other non-metallic inclusions to float to the top. This is effected by varying the preheating temperature in accordance with the size of the slabs 10 and 11, the pouring temperature of the bonding metal, and the width of the space 12. As soon as the bonding metal has solidified or reached the temperature of the slabs 10 and 11, the composite slab is ready for rolling. The pouring sprue 16, having oxidized during the preheating process, is readily knocked off by dropping the composite slab from a crane or by swinging it against a heavy object.

When the composite slab is formed in this manner, the defects of the methods of the prior art, described hereinbefore, are overcome, and the resulting slab may be rolled or drawn without any separation taking place between the slabs 10 and 11 and the finished product will contain uniform amounts of both materials forming the slabs 10 and 11.

When the method according to the present invention is employed, a further advantage is obtained in the unlimited choice of various metals and alloys to form the bonding metal. For example, I have secured satisfactory results by employing a bonding metal of mild steel containing 0.08% to 0.12% carbon for bonding a backing slab 10, formed of low carbon steel, to the facing slab 11 formed of 18-8 stainless steel. Higher carbon steels may be employed for the bonding metal, although they do not weld as readily to both slabs when they are formed of the materials described. If the higher carbon steel for the bonding metal is used, the assembly should be subjected to higher preheating temperatures, with a greater space 12 between the slabs 10 and 11 and a higher pouring temperature for the bonding metal. Since it is unnecessary to employ a high cost bonding metal, in most instances the space 12 between the slabs 10 and 11 can be increased as desired, and this space may then be considered as part of the backing material thickness as provided by the backing slab 10. I have found that nickel steel, or pure nickel in some cases, facilitates bonding, and that high copper-nickel alloys are usable and that they permit a high hot rolling temperature of the composite slab.

It is difficult, if not impossible, to satisfactorily bond together high carbon steel and high carbon stainless steel slabs when the methods of the prior art are employed. However, it is possible to form a composite slab of these two materials when the method according to the present invention is employed. For this purpose, I use a low carbon steel for the bonding metal and pour it into the space 12 in the manner described hereinbefore.

For the formation of some composite slabs, a relatively long preheating period is required with the bonding metal in the molten state. For such a slab I use a bonding metal having, besides the other required properties, a melting temperature 200° F. to 300° F. under the melting point of the materials forming the slabs 10 and 11. The bonding metal thus employed has a freezing temperature such that hot rolling is permitted at about 2200° F. For example, when two ferrous metals form the slabs 10 and 11 and have melting temperatures of about 2700° F. and hot rolling temperatures of about 2200° F., a bonding metal formed of substantially equal parts of copper and nickel may be employed. This alloy melts at about 2400° F. and can be hot rolled at a white heat. Its melting temperature is in the neighborhood of 2400° F. This melting temperature can be increased or decreased by increasing or decreasing the nickel content, respectively.

If the bonding metal has a lower melting temperature than either of the slabs 10 and 11, it is unnecessary to pour it. The space 12 can be filled with solid bonding metal while cold, either as a single sheet or in the form of small pieces, and the remaining space filled with flux. The assembly is then placed in the soaking pit, and the bonding metal is melted and maintained in the molten state for the desired soaking period. The invention disclosed herein is not limited to the bonding together of two ferrous metal slabs 10 and 11, since it is possible to employ it in bonding together two slabs, one of which is formed of a ferrous metal and the other is formed of a non-ferrous metal, which do not readily bond directly to each other. For example, a backing slab 10 formed of low carbon steel may be readily bonded to a facing slab 11 formed of three per cent silicon-copper alloy. The assembly formed of these materials is heated to a temperature below the melting temperature of silicon bronze, and a bonding metal formed of low silicon-copper alloy or of pure copper, or a nickel copper alloy, may be poured in the space 12 to form the required bond.

It is pointed out that it is preferable to form the mold strip 13 of relatively thin mild steel that has sufficient section to withstand the temperature to which it is subjected during the preheating process but still be flexible enough to permit individual expansion of the slabs 10 and 11. For composite slabs weighing approximately 3,000 pounds and requiring a preheating of approximately five hours, I have found that a one-fourth inch thick steel strip serves the purpose well.

When the bonding metal, which may or may not vary from the composition of the slabs 10 and 11, is poured into the space 12 between them, the advantage of the bond that is formed by the casting process, previously described as being a part of the prior art, is obtained which is more positive than the bond that is obtained by the heat and pressure method applied at different times. At the same time, by pouring only a small amount of bonding material as compared to the mass of the slabs 10 and 11, one of the chief objections to the use of the casting process is removed. A uniform bonding line or depth of diffusion is provided without excessive melting of either of the slabs 10 and 11, and yet a sufficient depth of diffusion is present to permit rolling or drawing without separation of the two materials. Moreover, the bond is uniform throughout the entire composite slab, since the molten bonding metal insures complete contact over the entire bonding surfaces 20 and 21 during the preheating period. As indicated hereinbefore, such uniformity is not obtained when the method of sequential application of heat and pressure is employed because of the uncertainty in obtaining complete contact between the two slabs during the welding period that may be caused by irregular surface conditions or non-uniformity in application of pressure.

In order to form a double composite slab, the assembly shown in Figure 4 of the drawing may be employed. As there shown, a pair of backing slabs 25 and 26 are suitably spaced from facing slabs 27 and 28 having a separating member 29 interposed therebetween. A mold strip 30 is provided around both of the spaces between the slabs, as illustrated, and the edges thereof are welded to the backing slabs 25 and 26 to form the liquid-tight spaces for the bonding metal. A pouring sprue, shown generally at 31, is formed through which the bonding metal 32 may be poured into the spaces between the slabs, as will be readily understood.

The spaces between the slabs are filled with a suitable flux, or the bonding surfaces are coated with a suitable flux as previously described, and then the assembly is preheated in the soaking pit to the required temperature. The bonding metal 32 is then poured into the spaces through the pouring sprue 31, and it penetrates or diffuses into the backing slabs 25 and 26 as indicated by the areas represented by the reference characters 35 and 36, respectively. In like manner, the reference characters 37 and 38 represent the depth of diffusion or penetration of the bonding metal 32 into the spacing slabs 27 and 28. The various impurities in the bonding metal 32 float to the surface and are lodged in the pouring sprue 31 as indicated at 39.

It will be understood that any of the various combinations of metals for the backing slabs 25 and 26 and the facing slabs 27 and 28, previously described, may be employed in forming the double composite slab shown in Figure 4 of the drawing.

In Figure 5 of the drawing I have shown an assembly that permits the bonding of metal slabs on opposite sides of a slab when all of the slabs have about the same melting points. For example, facing slabs 41 and 42 may be suitably spaced from opposite sides of an intermediate slab 43 to provide a coating for the opposite sides thereof. Mold strips 49 are provided around the spaces between the slabs 41, 42 and 43, as illustrated, and are welded or otherwise secured thereto to form liquid-tight spaces therebetween. Pouring sprues 45 are formed at the upper ends of the mold strips 49, as previously described, and the bonding metal 46 may be poured therethrough. The impurities, as indicated at 47, rise to the surface and lodge in the sprues 45.

In Figure 6 I have shown the manner in which a composite slab may be formed having facing portions widely spaced apart with a bonding metal filling the space therebetween. In this slab the facing slabs are formed of metals having high melting points and the bonding metal has a relatively low melting point. As illustrated, facing slabs 50 and 51 are provided, and they may be composed of a nontarnishing alloy, the composition of which is approximately 80% nickel, 12% chromium and 8% iron. This alloy is particularly desirable for the manufacture of such products as cooking utensils, but it is very inefficient as a heat conductor because of its low heat conductivity. Moreover, it is expensive. However, it is practical to employ this expensive material when the space therebetween is formed of a relatively inexpensive metal, such an copper shown at 52 in the molten state. Preferably the facing slabs 50 and 51 form about 5% of the total thickness of the composite slab, and they are so spaced as to leave about 80% of the total thickness of the composite slab as the mold opening. The mold is completed by welding a mold strip 53 along the bottom and up the two sides. As shown, the mold strip 53 would be provided of a sufficient width to bridge both of the facing slabs 50 and 51. A pouring sprue 54 is provided to more readily permit the pouring of the bonding metal into the mold formed by the bonding faces of the slabs 50 and 51. The space between the slabs 50 and 51 is filled with the bonding metal 52 formed of copper or copper alloy, or any suitable metal having a low enough melting temperature to permit this type of bonding without undue heating of the spacing slabs 50 and 51.

Since certain further changes may be made in the above method and construction, and different embodiments of the invention may be made without departing from the scope thereof, it is intended that all matter contained in the above description or shown in the accompanying drawing shall be interpreted as illustrative and not in a limiting sense.

I claim as my invention:

1. Method of joining two metal slabs with an intermediate layer of bonding metal which comprises disposing said slabs in spaced relation with their bonding surfaces facing each other, closing off said space to provide a liquid-tight receptacle capable of withstanding high temperatures without leaking defined in part by said bonding surfaces by welding metal strip means across said space along the adjacent edges of said liquid tight receptacle, heating said liquid tight receptacle, casting molten bonding metal in said space, and maintaining said metal slabs and said bonding metal at sufficiently high temperature for a long enough time to secure integral bonding therebetween.

2. Method of joining two slabs each consisting of a relatively high melting point metal by fusion bonding with an intermediate layer of metal of relatively lower melting point, which comprises disposing the slabs with their welding surfaces facing each other, welding strip metal to the adjacent margins of the slabs to join them mechanically and to provide a liquid tight mould of which the welding surfaces are a part, preheating the entire mould to a temperature at or above the melting point of the metal which forms the intermediate layer, filling the mould with said metal of lower melting point in molten condition to form the intermediate layer, the intermediate layer being kept in molten condition long enough to allow diffusion at the welding faces and thereby perfect a fusion bond.

3. Method of forming a composite metal slab comprising two slabs of ferrous metal with an interposed layer of cuprous metal, which comprises disposing the slabs with their welding surfaces facing each other in substantially parallel relation, welding strip ferrous metal to the adjacent margins of the slabs to hold them together mechanically and to provide a liquid tight mould of which the welding surfaces are a part, preheating the entire mould to a temperature of approximately 2300° F., filling the mould with said cuprous metal in molten condition to form the interposed layer, said cuprous metal being kept in molten condition in the mould long enough to secure diffusion at the welding faces and thereby perfect a diffusion bond.

THOMAS B. CHACE.

CERTIFICATE OF CORRECTION.

Patent No. 2,226,695.  December 31, 1940.

THOMAS B. CHACE.

It is hereby certified that error appears in the printed specification of the above numbered patent requiring correction as follows: Page 4, second column, lines 30 and 31, claim 1, for "liquid tight receptacle" read --slabs--; and that the said Letters Patent should be read with this correction therein that the same may conform to the record of the case in the Patent Office.

Signed and sealed this 4th day of February, A. D. 1941.

(Seal)

Henry Van Arsdale,
Acting Commissioner of Patents.